United States Patent
Ramsey et al.

(10) Patent No.: US 7,549,660 B2
(45) Date of Patent: Jun. 23, 2009

(54) FRAME OR SUBFRAME FOR TRACTOR-TRAILERS

(75) Inventors: John Edward Ramsey, Canton, OH (US); Michael D. Oyster, Stow, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 351 days.

(21) Appl. No.: 11/341,202

(22) Filed: Jan. 27, 2006

(65) Prior Publication Data

US 2006/0170205 A1 Aug. 3, 2006

Related U.S. Application Data

(60) Provisional application No. 60/648,942, filed on Feb. 1, 2005.

(51) Int. Cl.
*B62D 33/08* (2006.01)
*B62D 21/00* (2006.01)

(52) U.S. Cl. .............. 280/149.2; 280/788; 180/209

(58) Field of Classification Search .............. 280/149.2, 280/781, 789, 791, 793–795; 180/209; 403/231, 403/403; 29/897.2; 248/205.1, 247, 300
See application file for complete search history.

(56) References Cited

U.S. PATENT DOCUMENTS

| | | | | |
|---|---|---|---|---|
| 1,841,510 A | * | 1/1932 | Ranst | 280/794 |
| 2,173,515 A | * | 9/1939 | Eklund | 280/794 |
| 3,761,108 A | * | 9/1973 | Hemmings | 280/788 |
| 5,005,864 A | * | 4/1991 | Chachere | 280/800 |
| 5,720,489 A | * | 2/1998 | Pierce et al. | 280/149.2 |
| 5,725,247 A | * | 3/1998 | Nilsson et al. | 280/781 |
| 6,213,507 B1 | | 4/2001 | Ramsey et al. | |
| 6,244,608 B1 | * | 6/2001 | Hess | 280/149.2 |
| 6,279,933 B1 | * | 8/2001 | Ross et al. | 280/149.2 |
| 6,398,251 B1 | | 6/2002 | Smith | |
| 6,412,818 B1 | * | 7/2002 | Marando | 280/781 |
| 6,808,035 B1 | | 10/2004 | Keeler | |
| 6,905,137 B2 | * | 6/2005 | Fowler et al. | 280/781 |
| 7,156,421 B2 | * | 1/2007 | Fowler et al. | 280/781 |
| 7,261,322 B2 | * | 8/2007 | Ito et al. | 280/781 |
| 2005/0082814 A1 | * | 4/2005 | Ramsey | 280/793 |
| 2005/0087971 A1 | * | 4/2005 | Studebaker et al. | 280/781 |
| 2005/0116459 A1 | * | 6/2005 | Ito et al. | 280/781 |
| 2007/0001421 A1 | * | 1/2007 | Pierce et al. | 280/149.2 |
| 2007/0024017 A1 | * | 2/2007 | Ramsey | 280/149.2 |

* cited by examiner

*Primary Examiner*—Paul N. Dickson
*Assistant Examiner*—Drew J. Brown
(74) *Attorney, Agent, or Firm*—Krugliak, Wilkins, Griffiths & Dougherty Co., L.P.A.; David P. Dureska; Brent L. Moore

(57) ABSTRACT

A frame or subframe for a tractor-trailer for supporting one or more axle/suspension systems includes a pair of spaced-apart, parallel, elongated, and longitudinally extending main members. At least one cross member structure extends between and is connected to the longitudinal main members using structural nodes. A bonding adhesive, or other suitable means of attachment, connects the cross member structure and the structural nodes to one another and to the main members. The structural nodes distribute loads encountered during vehicle operation generally over a relatively large area thereby generally reducing the concentration of such loadings at the connections, and assist in generally evenly distributing loads between the cross member structure and the main members to effectively react lateral, longitudinal, vertical, and racking loads. The combination of greater load distribution and reduced loading concentrations allows the structure to be constructed from lighter weight materials.

17 Claims, 7 Drawing Sheets

FRAME OR SUBFRAME FOR TRACTOR-TRAILERS

CROSS-REFERENCE TO RELATED APPLICATION

This application claims the benefit of U.S. Provisional Patent Application Ser. No. 60/648,942, filed Feb. 1, 2005.

BACKGROUND OF THE INVENTION

1. Technical Field

The invention relates to tractor-trailer frames and subframes, and in particular, to subframes for trailers such as van trailers. More specifically, the invention is directed to a movable subframe comprising a combination of main members, cross-members, and cross braces interconnected by structural nodes and secured with an adhesive, for effectively reacting lateral, longitudinal, vertical, and racking loads to thereby securely support one or more axle/suspension systems suspended therefrom while reducing the overall weight of the subframe.

2. Background Art

Movable subframes, typically referred to as slider boxes, slider subframes, slider undercarriages, or slider secondary frames, have been utilized on tractor-trailers or semi-trailers for many years. One or more axle/suspension systems usually are suspended from a single slider box. For purposes of clarity, hereinafter the present invention will be referred to as a slider box. It is understood that a slider box outfitted with usually two axle/suspension systems typically is referred to as a slider or slider tandem, and again, for purposes of clarity will hereinafter be referred to as a slider tandem. The slider tandem in turn is mounted on the underside of the trailer frame, and is movable longitudinally therealong to provide a means for variable load distribution and vehicular maneuverability. More specifically, the amount of cargo that a trailer may carry is governed by local, state and/or national road and bridge laws, and is dependent on proper load distribution. The basic principle behind most road and bridge laws is to limit the maximum load that a vehicle may carry, as well as limit the maximum load that can be supported by individual axles. A trailer having a slider tandem gains an advantage with respect to laws governing maximum axle loads. More particularly, proper placement of the slider tandem varies individual axle loads or redistributes the trailer load so that it is within legal limits. Once properly positioned, the slider tandem is locked in place on the underside of the trailer by a retractable pin mechanism.

Conventional or prior art slider box designs were developed before the advent of air suspension systems for trailers. At that time, leaf spring suspension systems were the suspension of choice for van trailer frames and slider boxes. However, the leaf spring suspension system was unable to provide much load distribution for varying load situations.

Moreover, the subsequent development of air suspension systems provided load equalization among multiple axles for tractor-trailers, with or without the utilization of slider boxes, as well as improved ride quality for individual axles. Of course, the combination of a movable slider box and an air suspension system provided maximum versatility with respect to variable load distribution and load equalization in a trailer. Unfortunately, prior art slider boxes equipped with air suspensions add unwanted weight to the trailer, primarily because those slider boxes were originally built to support spring suspensions and adapting them to incorporate air suspensions required additional bracing and support.

Additionally, vehicles containing more than one non-steerable axle, including tractor-trailers, are subject to lateral or side loads. Lateral loads can act through the slider box in opposite directions, and the effect of such bending loads on the slider box can be significant. Moreover, a slider box is subjected to strong vertical and longitudinal loads. Thus, the loads to which the slider box is subjected must be controlled by the slider box design. Prior art slider box designs control vertical loads by utilizing rigid, and therefore heavy, main members and cross members typically made of steel. The cross members typically are spaced-apart and parallel to one another, and perpendicular to the longitudinally extending elongated main members. A pair of K-shaped cross members, as shown, described and claimed in U.S. Pat. No. 5,720,489 assigned to the same assignee, Hendrickson USA, L.L.C., as the instant invention, also have been utilized. Although the device described in the '489 patent performed its function, room for improvement still exists particularly with respect to maintaining or increasing the overall strength of the slider while decreasing its weight.

Thus, within the trucking industry, reducing the weight of carrier equipment without sacrificing durability directly improves productivity by increasing the available payload that can be transported by the vehicle. Slider boxes made of steel have contributed to the excessive weight problems that have plagued slider tandems in the past. Although certain prior art slider boxes formed of steel have exhibited weight and durability improvement over other prior art steel slider boxes, such as the slider box of the '489 patent, the trucking industry continually is striving for additional improvement in slider box design. Moreover, attempts to utilize materials that are lighter than steel to construct slider boxes, such as aluminum, have been largely unsuccessful and inefficient.

The present invention solves the problems of excessive weight and structural deficiencies subject to potentially damaging lateral, longitudinal, vertical, and racking loads on tractor-trailer slider boxes, by the combination of: i) forming the slider box of aluminum; and ii) adhesively bonding the cross members and cross braces to each other and to the main members and frame hangers via a plurality of structural nodes which function to: 1) interconnect the main components of the slider box; and 2) generally evenly distribute loads between the main components of the slider box. The adhesive bonding provides good impact resistance to and distributes the loads over a large joint thus generally avoiding concentrated loadings between components, the latter of which is undesirable. Moreover, the combination of greater load distribution and reduced concentrated loadings at the connections permit lighter materials, such as aluminum, to be used to efficiently construct the slider box, thereby reducing the overall weight of the slider box without loss of structural integrity, but rather with an improvement thereto in a cost-efficient manner. It is understood that while the preferred embodiment of the present invention is directed to movable subframes or slider boxes, the concepts of the present invention also can be effectively applied to non-movable subframes and primary frames of heavy-duty vehicles.

SUMMARY OF THE INVENTION

One objective of the present invention is to provide a subframe or frame for heavy-duty vehicles for effectively reacting lateral, longitudinal, vertical, and racking loads, but that is lighter in weight than prior art frames and subframes.

Still another objective of the present invention is to provide such a subframe or frame which can be more efficiently manufactured than prior art frames and subframes.

These objectives and advantages are obtained by the frame for a vehicle of the present invention, the frame including, a pair of spaced-apart, parallel, elongated and longitudinally extending main members, and at least one cross member extending between the main members, the cross member having at least a pair of ends, each cross member end being attached to a node structure, the node structure in turn being attached to a respective one of the main members, whereby the frame effectively reacts loads encountered by the vehicle during operation.

BRIEF DESCRIPTION OF THE DRAWINGS

The preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENTS

Figure 1:
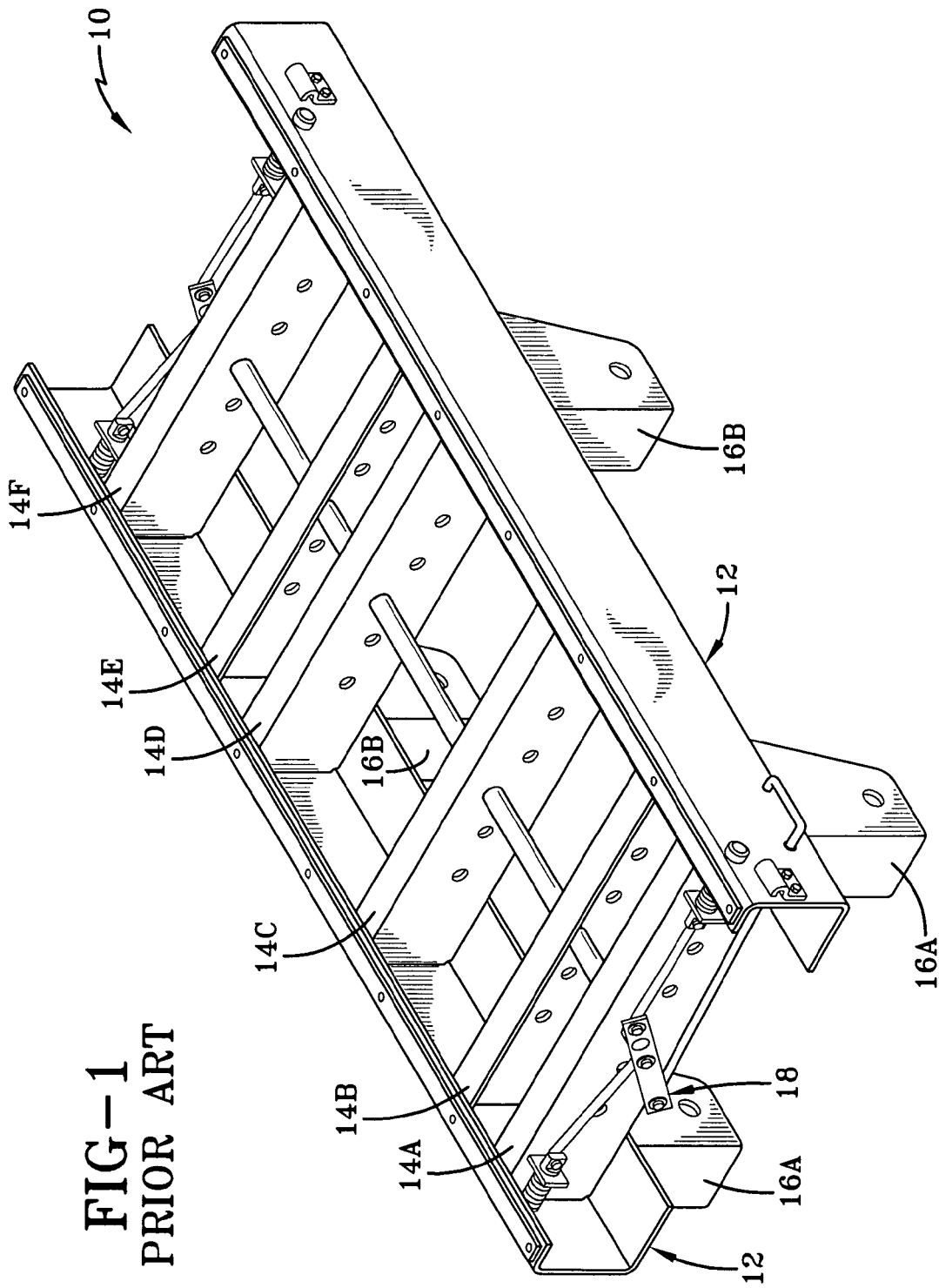
FIG. 1 is a perspective view of a conventional prior art slider box for a semi-trailer, having a plurality of transversely extending, spaced-apart, parallel cross members, showing the retractable pin mechanism used to selectively locate the slider box along the underside of a trailer, and further showing depending hangers for suspending axle/suspension systems.

So that the structure and resulting advantages of the present invention can best be understood, certain prior art slider boxes now will be described. Prior art configurations of slider boxes typically consist of generally C-shaped steel main frame members with generally C-shaped steel cross members arranged in a generally ladder-like or generally K-shaped configuration. More specifically, one type of prior art slider box 10, as shown in FIG. 1, generally includes a pair of elongated, longitudinally extending, spaced-apart parallel main members 12. Main members 12 are connected to each other by a plurality of spaced-apart, parallel, transversely extending generally C-shaped cross members, 14A-F. Cross members 14A-F extend between and are perpendicular to main members 12, and typically each nest in and is welded at its ends to the main members to form an interconnected rigid slider box structure 10. Main members 12 and cross members 14A-F typically are formed of steel to enable slider box 10 to withstand the repeated loadings encountered during operation of the vehicle to which the slider box is movably attached, which significantly contributes to the excessive weight of many prior art slider boxes. Moreover, because cross members 14A-F typically are welded directly to main members 12, the heavy loadings imparted to the main members by the tandem slider suspension systems (not shown) are not optimally distributed to the other components of slider box 10, which can result in main members 12 twisting and/or flexing, or even bending under extreme load conditions. The tandem axle/suspension systems (not shown) are pivotally mounted on front and rear pairs of steel hangers, 16A and 16B, respectively, of slider box 10 in a manner well-known in the art. A retractable pin mechanism 18 used for locking slider box 10 in place on a primary frame (not shown) of the vehicle trailer, also is shown, but does not form part of the slider box 10.

Figure 2:
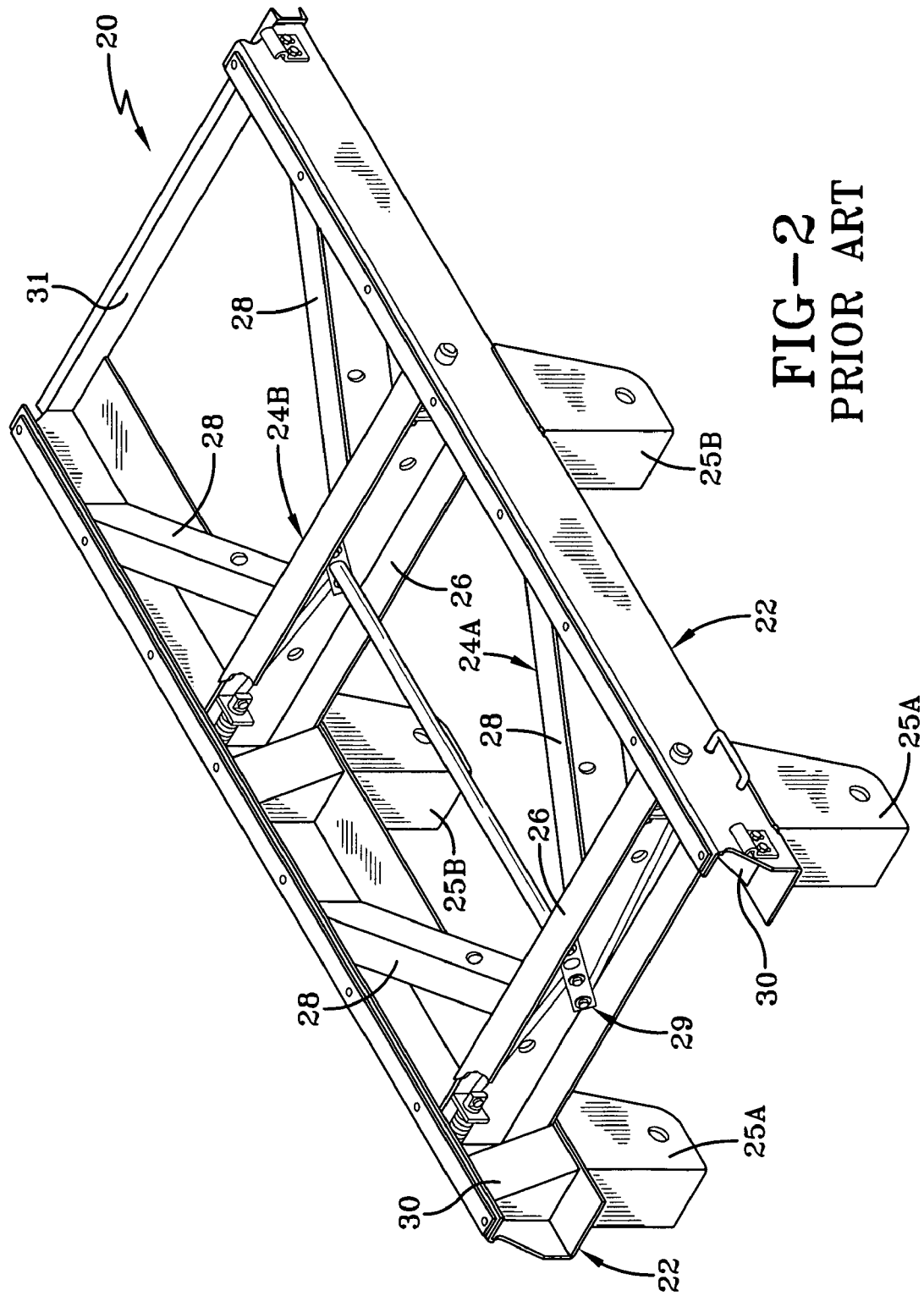
FIG. 2 is a perspective view of another prior art slider box for semi-trailers, having a pair of K-shaped cross member structures, showing the retractable pin mechanism used to selectively locate the slider box along the underside of a trailer, and further showing depending hangers for suspending axle/suspension systems.

Other types of prior art steel slider boxes have utilized different structural configurations in an attempt to better distribute the loads and reduce the overall weight of the slider box. For example, FIG. 2 is a perspective view of a slider box 20, which utilizes generally K-shaped cross members 24A and 24B. Slider box 20 includes a pair of elongated, longitudinally extending, spaced-apart parallel main members 22. Main members 22 are connected to each other by front K-shaped cross member 24A and rear K-shaped cross member 24B. K-shaped cross members 24A, B extend between and typically each nest in and are welded to main members 22 to form an interconnected rigid slider box structure 20. Front and rear pairs of hangers 25A and 25B, respectively, of slider box 20 suspend tandem axle/suspension systems (not shown) from main members 22. More specifically, each main member 22 is a generally C-shaped beam typically made of steel. The open portion of each main member 22 is opposed to the open portion of the other main member and faces inboard in relation to slider box 20. Each K-shaped cross member 24A, B also is formed of steel and includes a base member 26 which extends between and is perpendicular to main members 22, and two inclined or angled cross brace members 28, each of which extend in a generally diagonal manner between a generally central portion of the base member and a respective one of main members 22 as shown in FIG. 2. Each end of base member 26, and the outboard end of each cross brace member 28, nests in the open portion of a respective one of main members 22, and are secured therein by any suitable means such as welding, again creating generally concentrated loadings at the point of attachment as with prior art slider box 10. A plurality of steel reinforcement boxes 30 are mounted on main members 22 adjacent to and above each hanger 26 to provide additional strength to slider box 20 for supporting hangers 26A, B, and the axle/suspension systems pivotally attached thereto. A reinforcement bar 31 is mounted on and extends between the rear ends of main members 22 to provide additional strength to the overall structure of slider box 20. A retractable pin mechanism 29 used for locking slider box 20 in place on a primary frame (not shown) of a vehicle also is shown, but does not form part of the slider box.

As noted above, both of the above-described prior art slider boxes 10 and 20 are formed primarily of steel, thereby increasing the overall weight of the slider box which is undesirable, and generally concentrate loadings at the abutted and welded joints of the various slider box components, which also is undesirable. While other prior art slider boxes have incorporated other types of material, such as lighter weight aluminum in attempts to solve such problems, such slider boxes are much more expensive to manufacture because the cross sections of the slider box components have to be oversized, as opposed to their steel counterparts, to compensate for the fact that aluminum possesses approximately only one-third the stiffness of steel. In addition, welding generally reduces the strength of aluminum within the heat affected zone. As a result, a need has existed in the art to develop a slider box that overcomes the disadvantages of the prior art and provides a more lightweight, yet sturdy, stable, and economical slider box that is capable of effectively distributing the loads imparted on the main members from the axle/suspension systems to the other slider box components.

Figure 3:
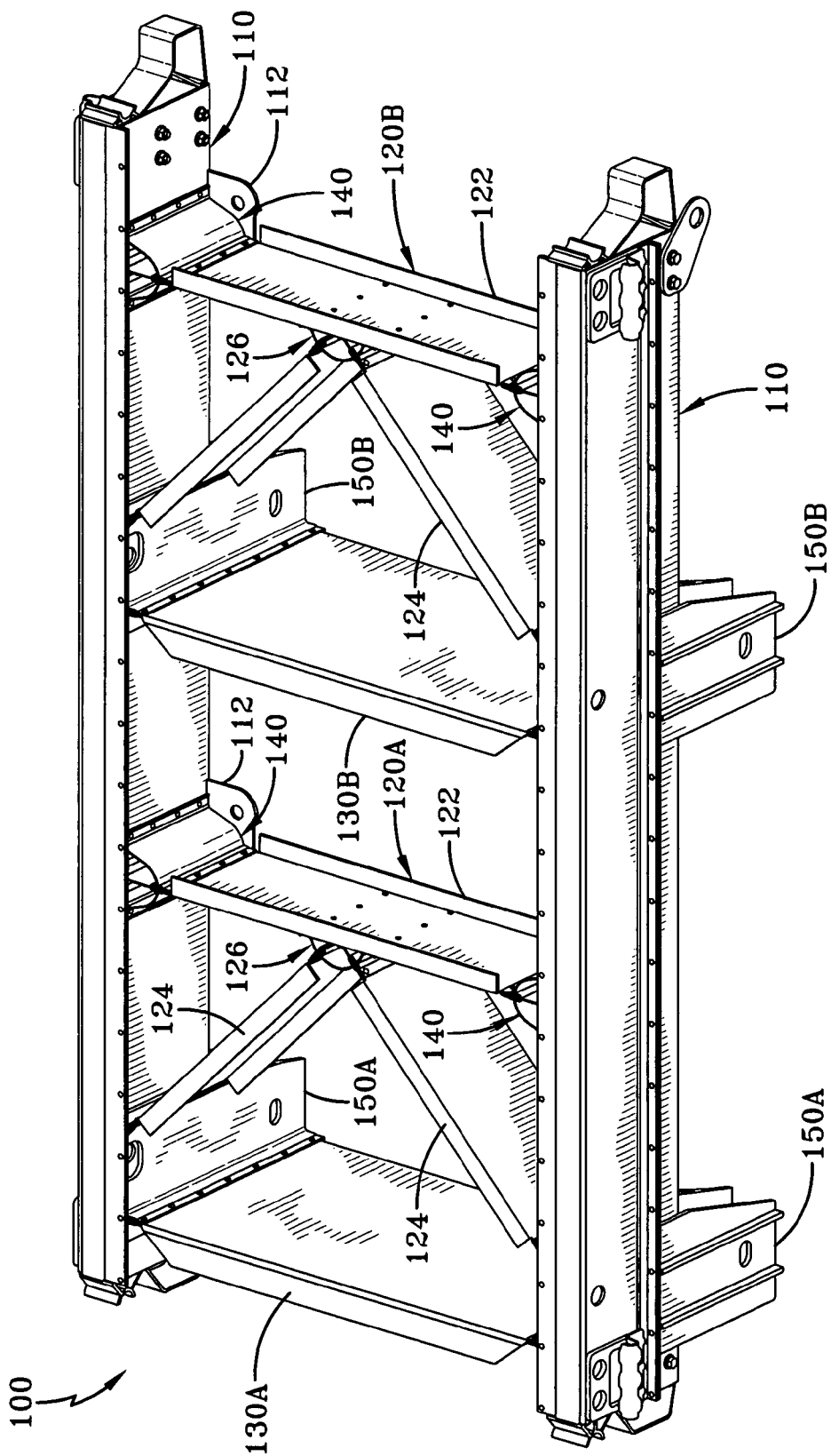
FIG. 3 is a top perspective view of the slider box of the present invention, showing the main members, cross members and cross braces interconnected by structural nodes, and further showing depending hangers for suspending axle/suspension systems.

The improved slider box of the present invention useful in a tractor-trailer is indicated generally at 100 and is shown in FIG. 3. Although slider box 100 of the present invention is similar in limited aspects to the prior art ladder-type and K-shaped slider boxes 10 and 20, respectively, described hereinabove and shown in FIGS. 1 and 2, slider box 100 exhibits many structural differences, thereby contributing to the improved performance of the slider box of the present invention over prior art slider boxes. The structural and resulting performance differences between slider box 100 of the present invention and prior art slider boxes 10, 20 now will be described.

Slider box 100 comprises a pair of main members 110, a pair of generally K-shaped cross members 120A, B each including a cross brace node 126, a pair of cross braces 124, and an air spring/cross member 122, pairs of air spring/cross member nodes 140, a pair of frame hanger cross members 130A, B and front and rear pairs of hangers, 150A and 150B, respectively, for suspending axle/suspension systems (not shown). Unless otherwise stated, all components of slider box 100 are formed of aluminum. However, it is understood that the present invention also contemplates the use of other materials that are lighter than steel, as will be described in greater detail below, yet which have sufficient strength for use in a slider box such as slider box 100 of the present invention. Unless otherwise stated, all immovable or fixed attachments of components of slider box 100 are made through the use of adhesive bonding material 160 (FIGS. 4A-5B), the application, use and benefits of which are described more fully hereinbelow.

More particularly, each main member 110 is an elongated, longitudinally extending beam, preferably having a rectangular cross-section, though it is contemplated that other cross-sectional shapes can be used without affecting the overall concept of the present invention. Main members 110 may be formed as a single piece or as a multiple-piece assembly. Main members 110 are arranged in a spaced-apart, parallel relationship.

One of the main features of the present invention is that a pair of air spring/cross member nodes 140 are vertically disposed and attached to the inboard side of each main member 110 in a longitudinally spaced-apart relationship as illustrated in FIG. 3. Air spring/cross member nodes 140 each extend substantially the entire vertical height of the inboard side of its respective main member 110.

An air spring mounting plate 112 is horizontally disposed and attached to a bottom surface of each air spring/cross member node 140 and its respective main member 110. Each air spring mounting plate 112, in conjunction with a respective main member 110, provides the mounting surface for the upper end of a respective axle/suspension system air spring (not shown), and functions to transfer to main members 110 and air spring/cross member nodes 140 certain loads imparted to slider box 100 by the air springs during operation of the vehicle. A certain portion of such loads is transferred directly from each air spring and directly into its respective main member 110.

More particularly, air spring/cross member nodes 140 and hanger nodes 150A, B are the primary means of distributing the lateral, longitudinal, vertical, and racking loads imparted to slider box 100 by the air springs (not shown) and the pivot connection of the axle/suspension system (not shown) during vehicle operation. More specifically, vertical loads are applied through the suspension air springs to the air spring mounting plates 112 and main members 110 which can cause an offset load and localized twisting of the main members. Air spring/cross member nodes 140 assist in distributing such loads between main members 110 and K-shaped cross members 120A, B, to minimize or eliminate such twisting.

Each hanger 150A, B is vertically disposed and immovably attached to the inboard and outboard sides of each main member 110 in a longitudinally spaced-apart relationship as illustrated in FIG. 3. Each hanger 150A, B further extends substantially the entire vertical height of the inboard side of its respective main member. The lower portion of each hanger 150A, B extends below the bottom surface of main member 110, to enable mounting of a suspension assembly (not shown) thereon in a manner well-known in the art. Hangers 150A, B serve the dual function of suspension assembly hanger and structural node for slider box 100. More specifically, a suspension assembly beam is pivotally captured in the lower portion of its respective hanger 150A, B that extends downwardly from main member 110. Each hanger 150A, B further comprises an inboardly extending cross member joint 152 and an inboardly rearwardly extending cross brace joint 154, as more fully described hereinbelow.

Figure 5A:
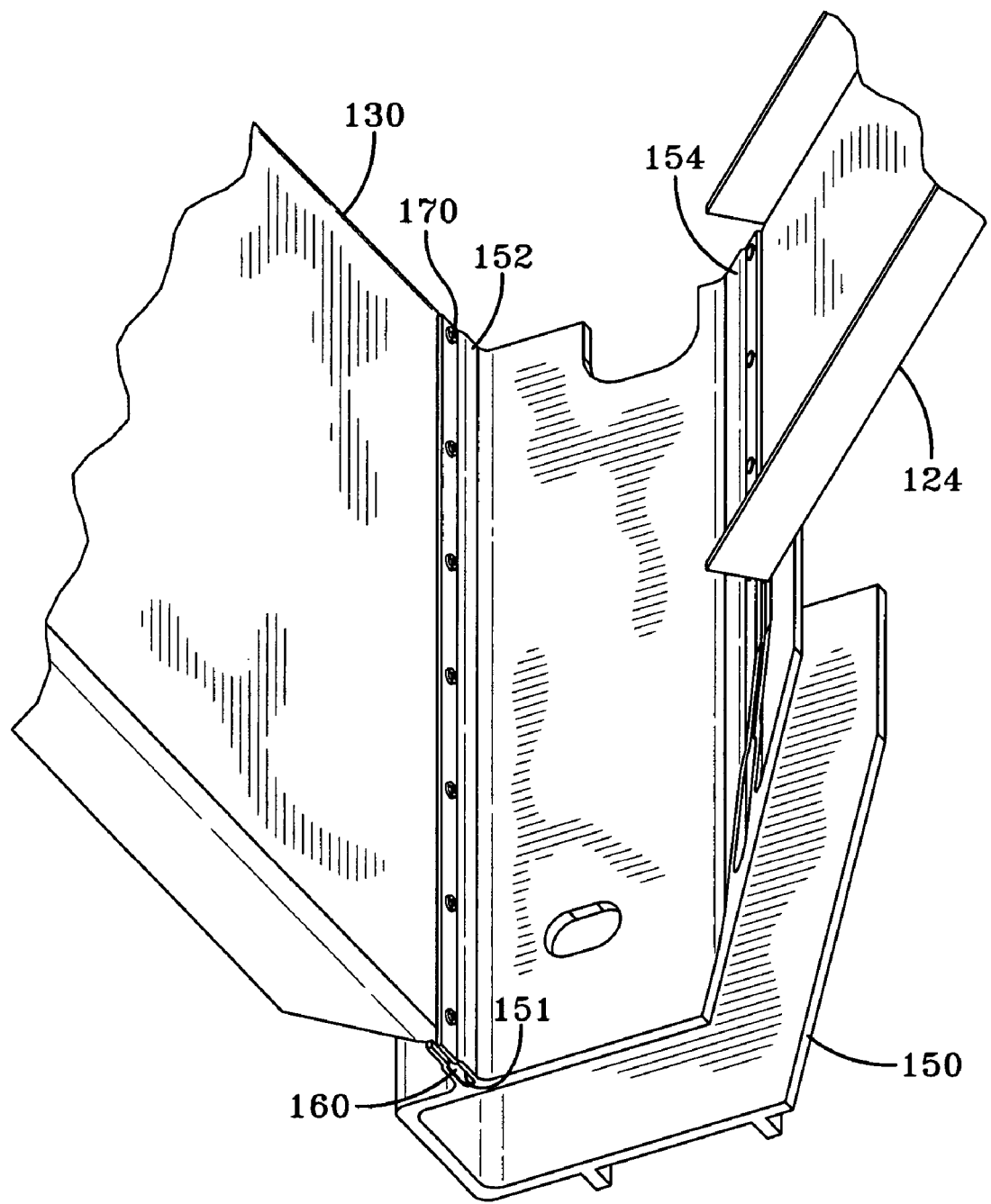
FIG. 5A is an enlarged fragmentary bottom perspective view of a portion of the slider box shown in FIG. 3, and showing one of the depending hangers for suspending an axle/suspension system and for interconnecting one of the cross braces and one of the frame bracket cross members to one of the main members.
Figure 5B:
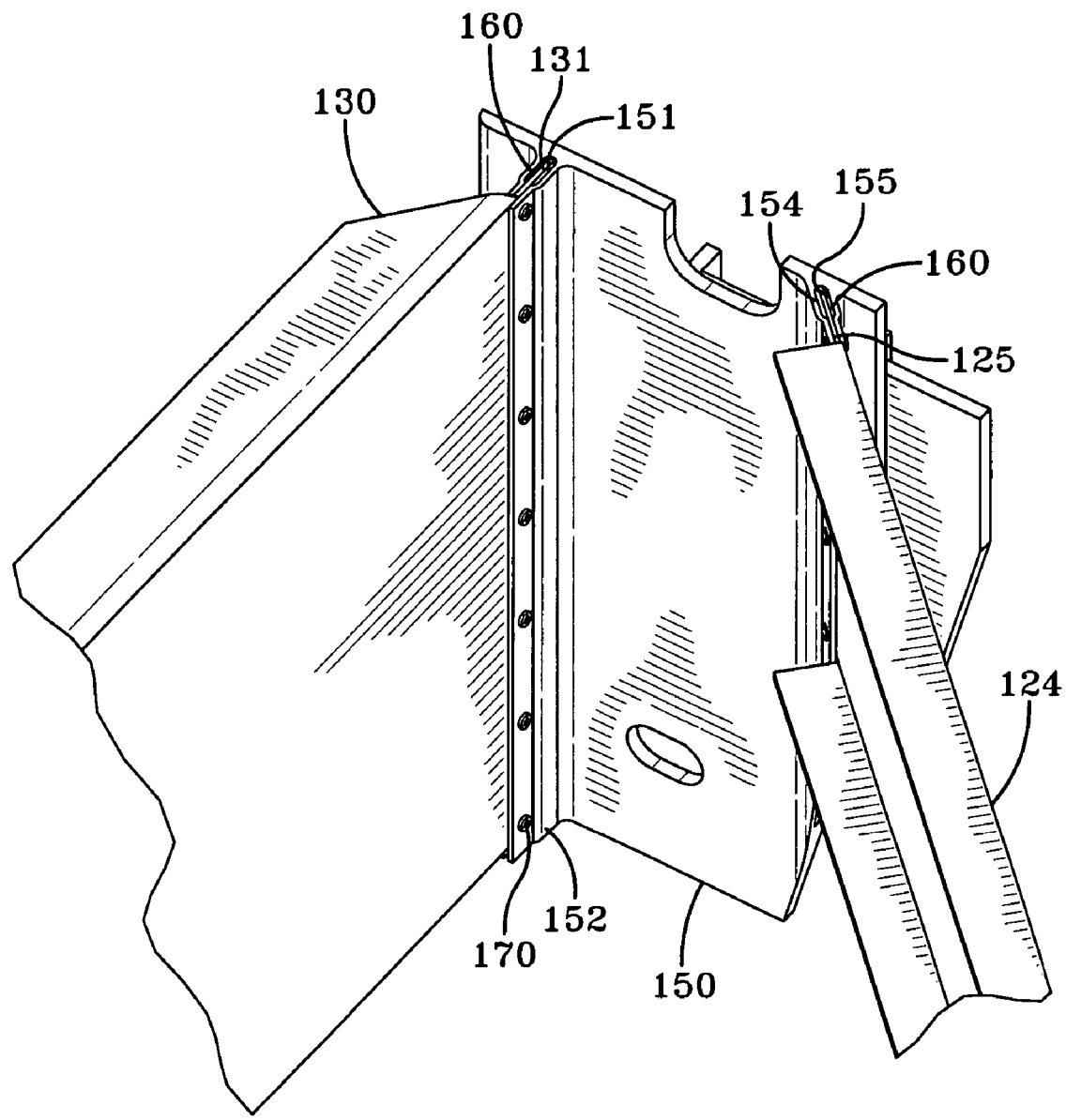
FIG. 5B is an enlarged fragmentary top perspective view of the portion of the slider box shown in FIG. 5A.

More particularly, main members 110 are connected to each other in spaced-apart parallel relationship by the pair of frame hanger cross members 130A, B and the pair of K-shaped cross members 120A, B, as shown in FIG. 3. Each frame hanger cross member 130A, B extends between and is generally perpendicular to main members 110 and is attached at each of its ends to a respective one of cross member joints 152 formed in its respective hanger 150A, B. More specifically, each end of cross members 130A, B includes a tongue 131 (FIG. 5B) which is formed integrally with, and extends outboardly beyond, the generally C-shaped cross section of the cross member for seating in and immovable attachment to cross member joint 152. Cross member joint 152 preferably is formed with a corresponding-shaped slot or groove 151 for receiving tongue 131. A suitable adhesive, such as an epoxy, acrylic, methacrylate, or urethane adhesive, is applied in groove 151 of hanger cross member joint 152 prior to insertion of tongue 131 therein to create a secure attachment between the components, as best illustrated in FIGS. 5A and 5B.

In accordance with another main feature of the present invention, each K-shaped cross member 120A, B includes an air spring/cross member 122, a pair of cross braces 124 and cross brace or bracing node 126. More specifically, air spring/cross member 122 and cross braces 124 each preferably have a generally C-shaped cross section, though it is contemplated that other cross sectional shapes including, "I," "G," "T," and flat plates can be used without affecting the overall concept of the present invention. It is understood that cross member 130A, B, described immediately above, also could have such cross-sectional shapes, if desired. Air spring/cross member 122 extends between and is generally perpendicular to main members 110. A cross brace node 126 is secured to the front vertical surface of each air spring/cross member 122, preferably approximately midway between each main member 110, as illustrated in FIG. 3 and described in greater detail hereinbelow. Each cross brace 124 extends between cross brace node 126 and a respective one of main members 110 in a generally diagonal direction.

Figure 4A:
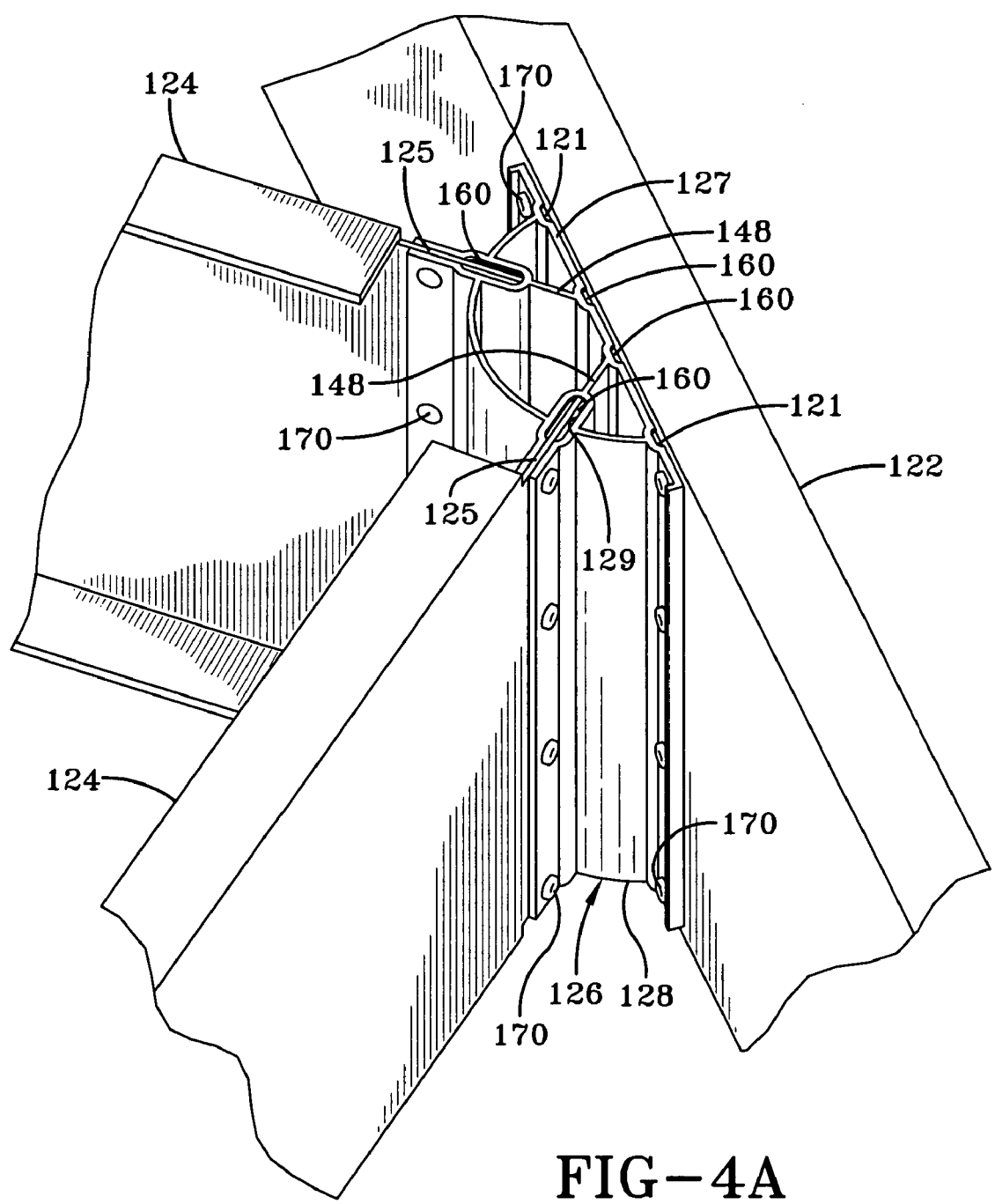
FIG. 4A is an enlarged fragmentary top perspective view of a portion of the slider box shown in FIG. 3, and showing one of the structural nodes used to interconnect a pair of the cross braces and one of the air spring/cross members.
Figure 4B:
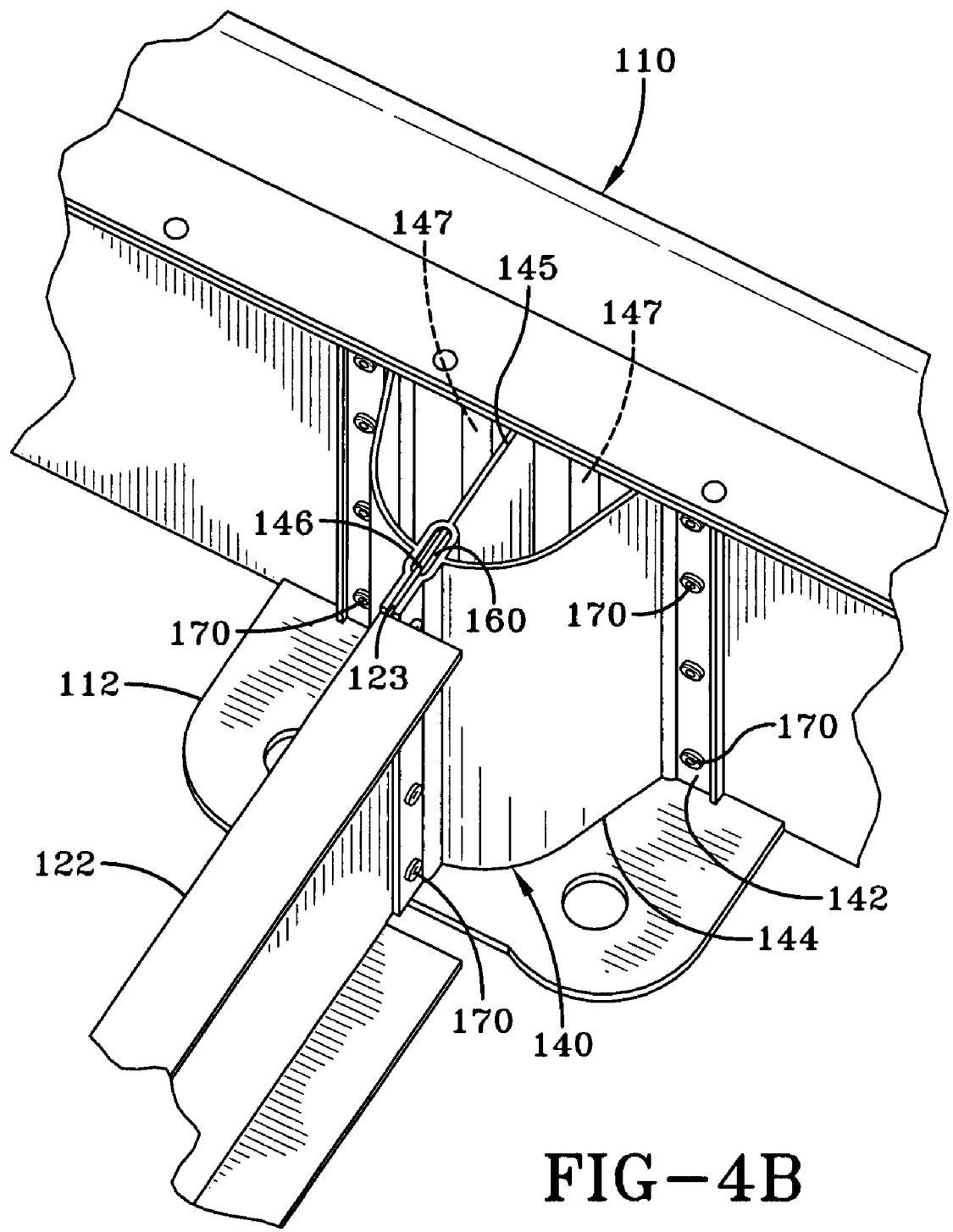
FIG. 4B is an enlarged fragmentary top perspective view of a portion of the slider box shown in FIG. 3, and showing one of the structural nodes used to interconnect one of the air spring/cross members and one of the main members.

More particularly, each end of each air spring/cross member 122 has a tongue 123 which is formed integrally with and extends outboardly beyond the generally C-shaped cross section of air spring/cross member 122 for immovable attachment to its respective air spring/cross member node 140, as best shown in FIG. 4B. Similarly, each end of each cross brace 124 also has a tongue 125 which extends beyond the generally C-shaped cross section of the cross brace for fixed attachment to cross brace node 126 and its respective frame hanger cross brace joint 154, as best illustrated in FIGS. 3, 4A, 5A, and 5B.

In the preferred embodiment of the present invention, each air spring/cross member node 140 (FIG. 4B) includes a back plate 142 and an inboardly extending integrally formed semi-cylindrical portion 144. An inboardly extending rib 145 is formed integrally at its outboard end with back plate 142, and at its inboard end is formed integrally with, generally bisects semi-cylindrical portion 144 and terminates in a slot or groove 146. Back plate 142 is attached to the inboard side of main member 110 by adhesive bonding material 160 applied in a plurality of channels 147 (hidden from view) formed in the outboard surface of back plate 142. Each air spring/cross member node 140 extends generally the entire vertical height of its respective main member 110. The relatively large surface area of contact between back plate 142 and main member 110 helps to reduce the concentrated loadings that have adversely affected prior art slider boxes as described above, thereby creating a secure connection between main members 110 and air spring/cross member 122 of each K-shaped cross member structure 120A, B. Cross member tongue 123, as best illustrated in FIG. 4B, seats in groove 146. Adhesive bonding material 160 is applied in each groove 146 prior to the insertion of its respective cross member tongue 123 therein.

In the preferred embodiment of the present invention, similarly, each cross brace node 126 (FIG. 4A) also includes a back plate 127 and a frontwardly-extending semi-circular portion 128 formed integrally with the back plate. A pair of generally diagonally extending ribs 148 each extend generally frontwardly outboardly from back plate 127, is formed integrally at its rear end with back plate 127, and at its front end is formed integrally with and intersects semi-circular portion 128, and terminates in a slot or groove 129. Cross brace node back plate 127 is attached to the front surface of air spring/cross member 122 by adhesive bonding material 160 applied in a plurality of channels 121 formed in the rear surface of back plate 127. Each cross brace node 126 extends generally the entire vertical height of its respective air spring/cross member 122. The relatively large surface area of contact between cross brace node back plate 127 and air spring/cross member 122 helps to reduce the concentrated loadings that have adversely affected prior art slider boxes as described above. Adhesive bonding material 160 also is applied in each of grooves 129, and in a corresponding-shaped slot or groove 155 formed in each frame bracket cross brace joint 154, prior to the insertion of respective cross brace tongues 125 therein, as best illustrated in FIGS. 4A, 5A and 5B.

Having described the structure of slider box 100, its benefits now will be described. Slider box 100 of the present invention is unique in its combination of adhesively bonded generally K-shaped cross members 120A, B, frame bracket cross members 130A, B, air spring/cross member nodes 140, hanger nodes 150A,B, and cross brace nodes 126, which enable the slider box to better distribute the loads imparted to it by the axle/suspension systems it supports. More specifically, the axle/suspension systems impart lateral, longitudinal, vertical, and racking loads to slider box 100 via the air springs and frame bracket suspension pivot connections. In accordance with one important feature of the present invention, frame bracket cross members 130A, B distribute the side loads laterally from respective ones of hangers 150A, B to the other via frame bracket cross member joints 152, while air spring/cross members 122 and cross braces 124 evenly distribute side loads and racking loads to the air spring/cross member nodes 140 and cross brace joints 154, which are spaced apart along the inboard side of main members 110. This overall structure serves to protect main members 110 from concentrated loadings.

In accordance with another feature of the present invention, air spring/cross member nodes 140 and front and rear hangers 150A and 150B, respectively, and cross brace nodes 126, also function as structural nodes, and the hangers further include cross member joints 152 and cross brace joints 154. By virtue of their adhesive bonding to main members 110 described above, air spring/cross member nodes 140 and hangers 150A, B distribute the loads from air spring/cross member 122, frame bracket cross member 130 and cross braces 124 along a larger surface area of main members 110, thereby reducing the undesirable concentrated loadings that are common in prior art slider boxes. Moreover, because slider box 100 of the present invention reduces concentrated loadings and more efficiently distributes loads, steel components, which significantly increase the overall weight of the slider box, are not required. Therefore, the components of slider box 100 of the present invention can be constructed of lighter materials, such as aluminum, thereby reducing the overall weight of the slider.

An additional benefit of using adhesive bonding to connect the components of slider box 100 is that adhesive bonding displays good impact resistance and distributes the loads equally along the connection. Moreover, adhesive bonding does not reduce material properties as other means of connection such as welding, sometimes does, and can be easily repaired. The present invention also contemplates the use of self-pierce rivets 170 as a secondary means of attachment, as shown in FIGS. 3-5. The self-pierce rivets 170 can be used to secure the various slider box components together while adhesive bonding material 160 cures, and thereafter provides a redundancy in the means of attachment. Alternatively, the attachment of the various components of slider box 100 could be made by conventional methods such as welding, riveting, or bolting.

While air spring/cross members 122, cross braces 124, cross brace nodes 126, frame hanger cross members 130A, B, air spring/cross member nodes 140 and front and rear hangers 150A and 150B, respectively, are preferably formed of aluminum extrusions, it is also contemplated that those components could be formed of other materials such as steel, titanium, plastics, or composites including glass or fiber reinforced plastics, depending on cost/benefit or requirements, or by other production techniques such as casting, pultrusion, or welded fabrication, without affecting the overall concept of the present invention.

Therefore, it can be seen that slider box 100 of the present invention overcomes the disadvantages of the prior art and provides a lightweight, economical slider box that is capable of optimally distributing the loadings encountered by the slider box during operation of the vehicle to which it is attached, and that is relatively easy to manufacture. The slider box of the present invention has a wide range of potential applications including, without limitation, the refrigerated van and dry van markets, as well as any other weight sensitive subframe application. Moreover, the concepts of the present invention could also be employed on non-movable or fixed subframes, such as those found on grain haulers, dump trailers or fuel tankers, or on vehicles that do not have a subframe, but rather only have a primary frame, such as a flatbed trailer or certain dump trailers, as well as leading or trailing arm axle-suspension systems.

Accordingly, the heavy-duty vehicle frame or subframe of the present invention is simplified, provides an effective, safe, inexpensive and efficient structure and method which achieves all the enumerated objectives, provides for eliminating difficulties encountered with prior art frames and subframes, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved heavy-duty vehicle frame or subframe is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A frame for a vehicle, said frame comprising:
   a) a pair of spaced-apart, parallel, elongated and longitudinally extending main members;
   b) an air spring/cross member extending between said main members, said air spring/cross member having a pair of ends, each one of said air spring/cross member ends being attached to an air spring/cross member node, said air spring/cross member nodes in turn each being attached to a respective one of said main members; and
   c) a pair of cross braces extending between said air spring/cross member and said main members, each one of said cross braces having a pair of ends, one of said pair of cross brace ends being attached to a bracing node, and the other one of said pair of cross brace ends being attached to a hanger node, said bracing node in turn being attached to said air spring/cross member, and said hanger nodes in turn each being attached to and depending from a respective one of said main members, to support an axle/suspension system, whereby said frame effectively reacts to loads encountered by said vehicle during operation.

2. The frame of claim 1, in which said frame is formed from a material selected from the group consisting of aluminum, steel, a plastic, a composite, and titanium.

3. The frame of claim 1, further comprising:
   a hanger cross member extending between said main members, said hanger cross member having a pair of ends, each one of said hanger cross member ends being attached to a respective one of said hanger nodes.

4. The frame of claim 1, in which said air spring/cross member and said cross braces form a generally K shape.

5. The frame of claim 1, in which said frame includes a pair of said air spring/cross members and said pair of cross braces.

6. The frame of claim 1, in which an air spring mounting plate is attached to each one of said air spring/cross member nodes and its respective main member, for mounting an axle/suspension system air spring.

7. The frame of claim 1, in which each one of said air spring/cross member nodes further comprise:
   a) a back plate attached to a respective one of said main members;
   b) a semi-cylindrical portion integrally formed with said back plate;
   c) a rib integrally formed with said back plate and said semi-cylindrical portion, said rib generally bisecting said semi-cylindrical portion; and
   d) a groove integrally formed in said rib for receipt of a respective one of said air spring/cross member ends.

8. The frame of claim 1, in which said bracing node further comprises:
   a) a back plate attached to said air spring/cross member;
   b) a semicircular portion integrally formed with said back plate;
   c) a pair of outboardly extending ribs integrally formed with and extending between said back plate and said semicircular portion; and
   d) a groove integrally formed in each one of said pair of ribs for receipt of respective ones of said cross brace ends.

9. The frame of claim 1, in which each one of said hanger nodes further comprises:
   a) a first inboardly extending groove for receipt of a respective one of said cross brace ends; and
   b) a second inboardly extending groove for receipt of a respective one of said hanger cross member ends.

10. The frame of claim 1, in which said air spring/cross member is attached to said air spring/cross member nodes and said pair of cross braces is attached to said bracing node and said hanger nodes by an attachment means selected from the group consisting of adhesive bonding, welding, riveting or bolting.

11. A frame for a vehicle, said frame comprising:
    a) a pair of spaced-apart, parallel, elongated and longitudinally extending main members;
    b) an air spring/cross member extending between said main members, said air spring/cross member having a pair of ends, each one of said air spring/cross member ends being attached to an air spring/cross member node, said air spring/cross member nodes in turn each being attached to a respective one of said main members;
    c) a pair of cross braces extending between said air spring/cross member and said main members, each one of said cross braces having a pair of ends, one of said pair of cross brace ends being attached to a bracing node, and the other one of said pair of cross brace ends being attached to a hanger node, said bracing node in turn being attached to said air spring/cross member, and said hanger nodes in turn each being attached to and depending from a respective one of said main members, to support an axle/suspension system; and
    d) a hanger cross member extending between said main members, said hanger cross member having a pair of ends, each one said hanger cross member ends being attached to a respective one of said hanger nodes, whereby said frame effectively reacts to loads encountered by said vehicle during operation.

12. The frame of claim 11, in which said air spring/cross member and said cross braces form a generally K shape.

13. The frame of claim 11, in which said frame includes a pair of said air spring/cross member, a pair of said pair of cross braces, and a pair of said hanger cross member.

14. The frame of claim 11, in which an air spring mounting plate is attached to each one of said air spring/cross member nodes and its respective main member, for mounting an axle/suspension system air spring.

15. The frame of claim 11, in which each one of said air spring/cross member nodes further comprise:
   a) a back plate attached to a respective one of said main members;
   b) a semi-cylindrical portion integrally formed with said back plate;
   c) a rib integrally formed with said back plate and said semi-cylindrical portion, said rib generally bisecting said semi-cylindrical portion; and
   d) a groove integrally formed in said rib for receipt of a respective one of said air spring/cross member ends.

16. The frame of claim 11, in which said bracing node further comprises:
   a) a back plate attached to said air spring/cross member;
   b) a semicircular portion integrally formed with said back plate;
   c) a pair of outboardly extending ribs integrally formed with and extending between said back plate and said semicircular portion; and
   d) a groove integrally formed in each one of said pair of ribs for receipt of respective ones of said cross brace ends.

17. The frame of claim 11, in which each one of said hanger nodes further comprises:
   a) a first inboardly extending groove for receipt of a respective one of said cross brace ends; and
   b) a second inboardly extending groove for receipt of a respective one of said hanger cross member ends.

* * * * *